March 24, 1925.
A. G. STEINMETZ
1,530,626
CONSTRUCTION FOR VEHICLE BODIES
Filed Aug. 14, 1923
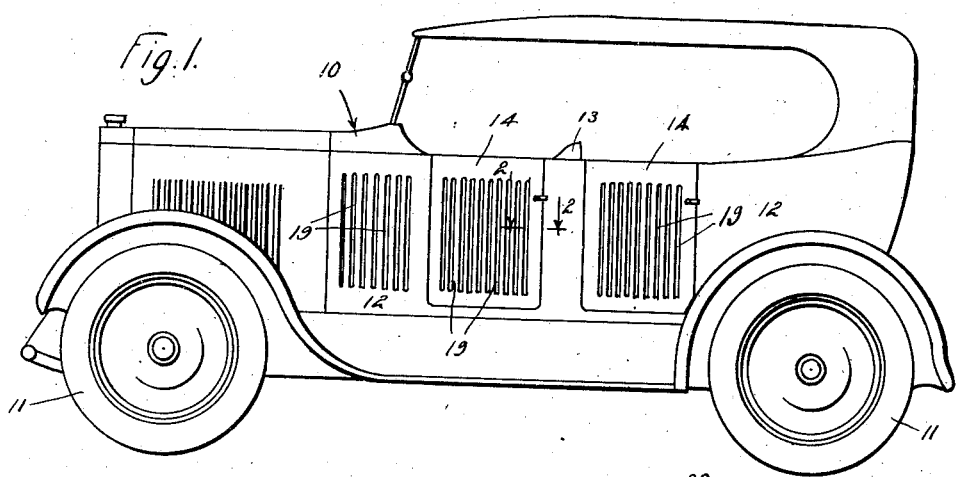
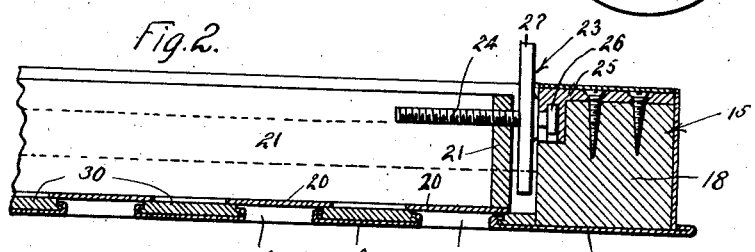
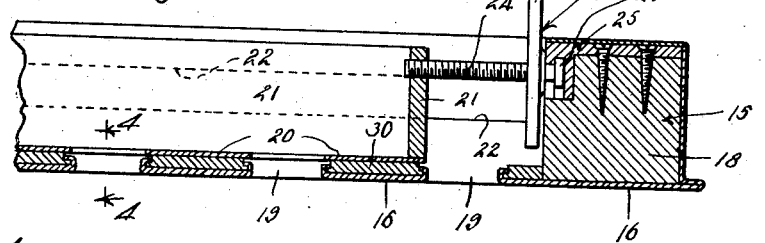
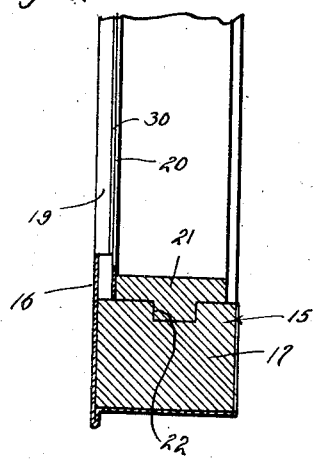
Inventor
A. G. Steinmetz
by W. H. Maxwell
his Attorney Patented Mar. 24, 1925.

1,530,626

UNITED STATES PATENT OFFICE.

AUGUST G. STEINMETZ, OF BOSTON, MASSACHUSETTS.

CONSTRUCTION FOR VEHICLE BODIES.

Application filed August 14, 1923. Serial No. 657,370.

*To all whom it may concern:*

Be it known that I, AUGUST G. STEINMETZ, citizen of the United States, and a resident of Boston, county of Suffolk, State of Massachusetts, have invented new and useful Improvements in the Construction for Vehicle Bodies, of which the following is a specification.

This invention has to do with a construction for motor vehicle bodies, it being particularly suited for application to the bodies of pleasure cars.

It is an object of this invention to provide a simple, effective construction for automobile bodies which allows for ventilation of the bodies, and for circulation of air in the bodies so that they may be kept cool.

Another object of this invention is to provide a construction of the character above specified which does not interfere with the lines of the body or which does not render the body unsightly.

Another object of this invention is to provide a construction such as I have above specified which embodies means for regulating or cutting off the ventilation or circulation of air so that the body may be maintained at the desired temperature.

Another object of this invention is to provide a construction of the character I have referred to which may be applied to bodies of ordinary construction, without changing any parts or may be applied to bodies of ordinary construction by changing or replacing certain parts.

The various objects and features of my invention will be best and more fully understood from the following detailed description of a typical preferred form and application thereof, throughout which description reference is had to the accompanying drawings, in which:

Fig. 1 is a side elevation of a typical pleasure motor car of the touring type, the body of said vehicle embodying my present invention;

Fig. 2 is an enlarged detail plan section, taken as indicated by the line 2—2 on Fig. 1, showing the ventilating openings provided by my invention closed;

Fig. 3 is a view similar to Fig. 2, showing the ventilating openings open; and

Fig. 4 is a vertical detail sectional view, taken as indicated by the line 4—4 on Fig. 3.

In accordance with the broader aspects of my invention it is applicable to motor vehicle bodies of various styles and types. For the purpose of facilitating a clear and full understanding of my invention I have chosen to describe it as applied to an open motor vehicle, the particular body referred to being of the touring type. The vehicle illustrated in the drawings includes a body 10; supporting wheels 11, for the body 10; and various other devices and parts common to machines of this general character. The body 10 being of the touring type includes a main portion 12, into which are built suitable seats 13, and doors 14 hinged to the main part 12. The construction provided by my invention is applicable to various portions of the main part of the body as well as to the doors 14. In the following description I will refer to my construction as being embodied in or applied to a door of the body, it being understood, of course, that the construction described is likewise applicable to various portions of the main part 12.

In the particular form of construction that I have illustrated, each door includes a face or panel 16, carried on a suitable frame 15. The frame 15 includes upper and lower horizontal parts 17, and vertical end parts 18. The frame and panel are, of course, designed and proportioned to fit and properly conform with the other parts of the body. The panel 16 is, in accordance with standard practice, formed of sheet metal, whereas, the frame is constructed of wood, or the like.

In accordance with my invention I provide the panels 16 with a plurality of ventilating openings in the form of slots 19. In ordinary situations the slots are preferably arranged vertically, or substantially vertically, are straight and are of substantially uniform width, and are evenly spaced. It will be obvious, however, that these factors may be varied in particular cases to suit circumstances, for instance, to conform to the design and construction of the body. The slots 19 are preferably comparatively long and there are preferably enough of them to extend substantially the entire width of the panel. In construction the slots may be formed by cutting or slitting the panel in the desired manner, and the edges of the slots may be finished by turning the cut edges inwardly or back, as I have clearly illustrated in Figs. 2 and 3 of the drawings. It will be obvious that the slots 19 formed in the panel, as I have illustrated in the drawings, allow air to pass through the door so that the body is ventilated and so that the air in the body is kept in circulation.

My invention provides closures 20 for the slots, so that the passage of air through the panel may be varied or cut off as may be desired. The closure 20 may be in the form of flat strips of material, for instance, sheet metal, sufficiently wide so that they can be positioned to extend completely across and close the slots. The closures 20 are mounted on a carrier 21, which is mounted in the frame of the door, so that it can be moved to move the closures into and out of register with the slots. When the slots 19 are vertically disposed the carrier 21 is mounted in the door so that it is movable horizontally. I have illustrated the carrier slidably mounted in suitable guideways 22, provided in the horizontal frame parts 17.

My invention provides means 23 for actuating the carrier 21. This means may include a screw 24, held by a bracket 25 secured to one of the vertical frame parts 18, having a screw threaded engagement with a suitable part of the carrier. In the construction illustrated in the drawings the screw 24 is provided with a head 26 which is rotatably carried by the bracket 25. The screw projects from the bracket and screw threads through a part of the carrier so that it causes movement of the carrier when rotated. A suitable hand wheel 27 is provided on the screw 24 so that it can be conveniently operated or rotated.

In practice it is desirable to provide suitable padding or packing between the panel 16 and closures 20 for the purpose of preventing rattling between these parts, and to make the construction tight and weatherproof when the closures are in position to close the slots. Suitable padding, for instance, felt or rubber, may be arranged at the inner side of the panel 16 so that it will prevent the closures 20 from contacting with the panel. The packing 30 may be in the form of strips held in place by the inwardly turned edge portions of the slots, as I have clearly illustrated in Figs. 2 and 3 of the drawings.

In employing my invention it may, as I have hereinbefore described, be applied to various parts of the body. The invention may be advantageously applied to the doors of the body and may be provided in the doors at the time they are manufactured or may be applied to the doors after they have been manufactured. In practice, a person wishing to employ my invention in seasons when his vehicle requires ventilation, may have doors provided with my invention that can be applied to his vehicle in place of the ordinary doors. It will be obvious from the foregoing description how my invention provides a construction which allows for effective ventilation and circulation of air in the body of the vehicle, and how it provides for regulation of the ventilation and circulation to suit circumstances. To regulate the amount of circulation or ventilation it is merely necessary to rotate the hand wheel 27 to move the carrier 21 so that the closures are in the desired positions with relation to the slots. The carrier can be positioned where the closure cuts off the slots, as illustrated in Fig. 2, or where the slots are completely open, as illustrated in Fig. 3.

Having described only a typical preferred form of my invention I do not wish to limit myself to the specific details hereinabove set forth but wish to reserve to myself any changes or variations that may appear to those skilled in the art or fall within the scope of the following claims.

Having described my invention, I claim:

1. In a vehicle body, a panel having a plurality of ventilation slots, closures for the slots, a carrier for the closures, and a screw operable to move the carrier to operate the closures relative to the slots.

2. In a vehicle body, a panel having a plurality of ventilation slots, closure strips for the slots at the inner side of the panel movable paralled to the plane of the panel to regulate the slots, and pads between the panel and closure strips.

3. In a vehicle body, a panel having a series of parallel vertical ventilation slots, closure strips for the slots located at the inner side of the planel, a carrier for the closure strips movable parallel to the plane of the panel in a direction transverse of the slots, screw means operable to move the carrier, and pads between the panel and closure strips.

4. In a vehicle body, a panel having a plurality of ventilation slots, having turned edges, closure strips for the slots at the inner side of the panel movable parallel to the plane of the panel to regulate the slots, and pads between the panel and closure strips.

5. In a vehicle body, a frame, a panel carried by the frame and having a plurality of slots in it, closures for the slots, a carrier for the closures slidably mounted in the frame, and a screw rotatably carried by the frame and engaging the carrier to operate it.

In witness that I claim the foregoing I have hereunto subscribed my name this 31st day of July 1923.

AUGUST G. STEINMETZ.

Witness:
LELAND M. CHUTE.